US012794367B2

(12) United States Patent
Oner et al.

(10) Patent No.: US 12,794,367 B2
(45) Date of Patent: Nov. 10, 2026

(54) CONDUCTION MODE CONTROL

(71) Applicant: Texas Instruments Incorporated, Dallas, TX (US)

(72) Inventors: Hakan Oner, San Jose, CA (US); Marc Davis-Marsh, San Jose, CA (US); Ankit Gupta, Sunnyvale, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 46 days.

(21) Appl. No.: 18/641,003

(22) Filed: Apr. 19, 2024

(65) Prior Publication Data

US 2025/0279725 A1 Sep. 4, 2025

Related U.S. Application Data

(60) Provisional application No. 63/559,496, filed on Feb. 29, 2024.

(51) Int. Cl.
*H02M 3/158* (2006.01)
*H02M 1/00* (2007.01)

(52) U.S. Cl.
CPC .................................. *H02M 3/158* (2013.01)

(58) Field of Classification Search
CPC .... H02M 3/156; H02M 3/158; H02M 1/0025; H02M 1/0096; H02M 1/0003
See application file for complete search history.

(56) References Cited

U.S. PATENT DOCUMENTS

| | | | | |
|---|---|---|---|---|
| 9,647,540 | B2 * | 5/2017 | Chen | H02M 3/156 |
| 9,929,653 | B1 * | 3/2018 | Mercer | H02M 7/4837 |
| 2014/0368174 | A1 * | 12/2014 | Houston | H02M 1/08 323/271 |
| 2019/0356223 | A1 * | 11/2019 | Chang | H02M 3/156 |

* cited by examiner

*Primary Examiner* — Sisay G Tiku
(74) *Attorney, Agent, or Firm* — Zhenhai Fu; Charles F. Koch

(57) ABSTRACT

A circuit includes an input terminal, a reference voltage circuit, a comparator, a delay circuit, a conduction mode control circuit, and a switching converter controller. The input terminal is configured to receive a converter output voltage. The reference voltage circuit has an output. The comparator has a first input coupled to the input terminal, a second input coupled to the output of the reference voltage circuit, and an overvoltage output. The delay circuit has an input coupled to the overvoltage output, and a delayed overvoltage output. The conduction mode control circuit has a first input coupled to the overvoltage output, a second input coupled to the delayed overvoltage output, and a mode output. The switching converter controller has a continuous conduction mode input coupled to the mode output.

20 Claims, 3 Drawing Sheets

CONDUCTION MODE CONTROL

CROSS-REFERENCE TO RELATED APPLICATIONS

This application claims priority to U.S. Provisional Application No. 63/559,496, filed Feb. 29, 2024, entitled "Method for Reducing Nuisance Tripping of Voltage Monitors for DC/DC Converters in Discontinuous Conduction Mode (DCM)," which is hereby incorporated by reference.

BACKGROUND

A switch mode converter is an electronic circuit that converts an input direct current (DC) voltage into one or more DC output voltages that are higher or lower in magnitude than the input DC voltage. A switch mode converter that generates an output voltage lower than the input voltage is termed a buck or step-down converter. A switch mode converter that generates an output voltage higher than the input voltage is termed a boost or step-up converter.

Some switch mode converter topologies include a drive/power switch coupled at a switch terminal to an energy storage inductor/transformer. Electrical energy is transferred through the energy storage inductor/transformer to a load by alternately opening and closing the switch as a function of a switching signal. The amount of electrical energy transferred to the load is a function of the ON/OFF duty cycle of the switch and the frequency of the switching signal. Switch mode converters are widely used in electronic devices, particularly battery powered devices, such as portable cellular phones, laptop computers, and other electronic systems in which efficient use of power is desirable.

SUMMARY

In one example, a circuit includes an input terminal, a reference voltage circuit, a comparator, a delay circuit, a conduction mode control circuit, and a switching converter controller. The input terminal is configured to receive a converter output voltage. The reference voltage circuit has an output. The comparator has a first input coupled to the input terminal, a second input coupled to the output of the reference voltage circuit, and an overvoltage output. The delay circuit has an input coupled to the overvoltage output, and a delayed overvoltage output. The conduction mode control circuit has a first input coupled to the overvoltage output, a second input coupled to the delayed overvoltage output, and a mode output. The switching converter controller has a continuous conduction mode (CCM) input coupled to the mode output.

In another example, a circuit includes a switching converter controller, a comparator, a delay circuit, and a conduction mode control circuit. The switching converter controller is configured to control switching of a switch mode converter circuit. The comparator is configured to compare a switch mode converter output voltage to an overvoltage threshold voltage, and provide an overvoltage signal indicating that the switch mode converter output voltage is greater than the overvoltage threshold voltage. The delay circuit is coupled to the comparator. The delay circuit is configured to delay the overvoltage signal, and provide a delayed overvoltage signal. The conduction mode control circuit has inputs coupled to the comparator and the delay circuit, and a mode output coupled to an input the switching converter controller. The conduction mode control circuit is configured to provide a CCM control signal based on the overvoltage signal and the delayed overvoltage signal. The switching converter controller is configured to transition from operation in a discontinuous conduction mode to operation in a continuous conduction mode responsive to the CCM control signal.

In a further example, a system includes a power source, a switch mode converter circuit, and an advanced driver assistance system. The power source has an output. The switch mode converter circuit has an input coupled to the output of the power source. The advanced driver assistance system has an input coupled to the output of the switch mode converter circuit. The switch mode converter circuit includes a reference voltage circuit, a comparator, a delay circuit, a conduction mode control circuit, and a switching converter controller. The reference voltage circuit has an output. The comparator has a first input coupled to the output of the switch mode converter circuit, a second input coupled to the output of the reference voltage circuit, and an overvoltage output. The delay circuit has an input coupled to the overvoltage output, and a delayed overvoltage output. The conduction mode control circuit has a first input coupled to the overvoltage output, a second input coupled to the delayed overvoltage output, and a mode output. The switching converter controller has a continuous conduction mode (CCM) input coupled to the mode output.

DETAILED DESCRIPTION

Figure 1:
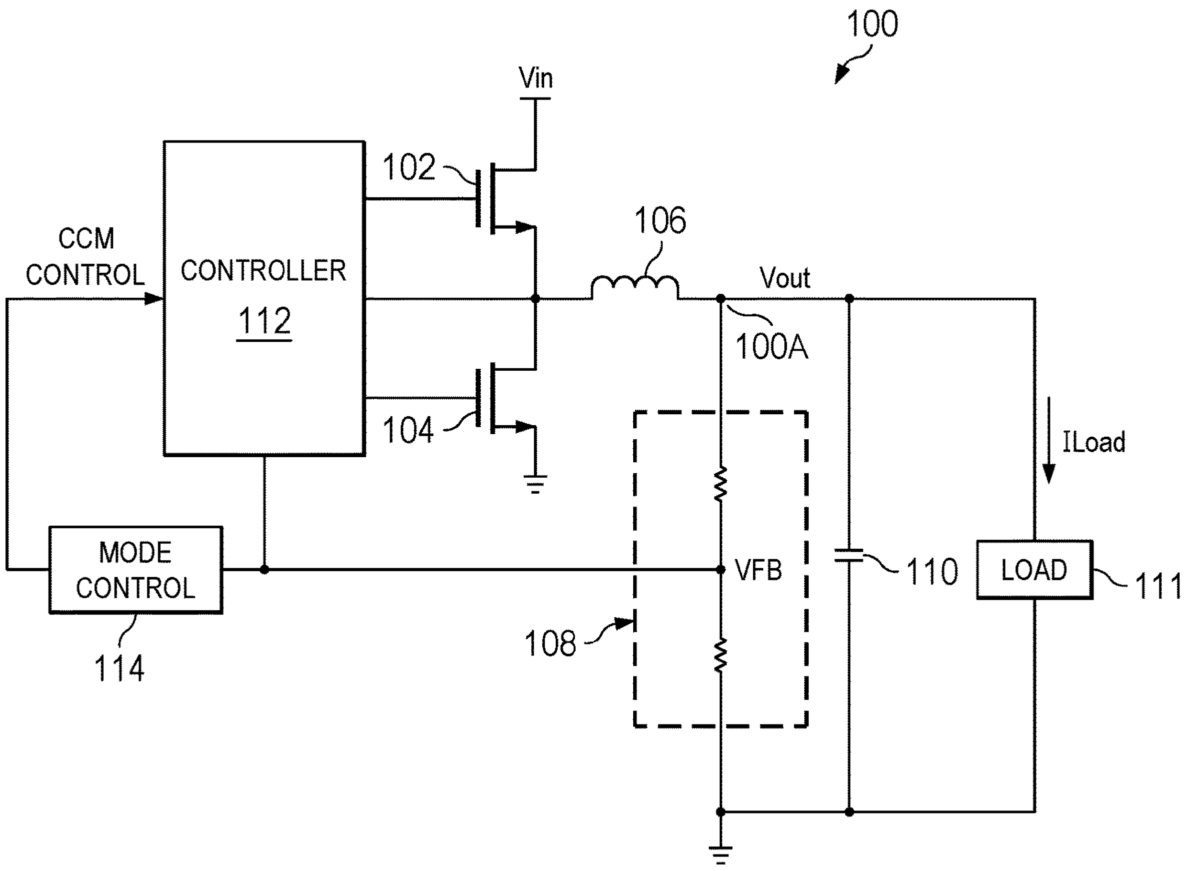
FIG. 1 is a block diagram of an example switch mode converter that includes conduction mode control based on the converter output voltage.

FIG. 1 is a block diagram of an example switch mode converter 100 that includes conduction mode control based on the converter output voltage. The switch mode converter 100 is a buck converter in the example of FIG. 1, and includes a high-side switching transistor 102, a low-side switching transistor 104, an inductor 106, a voltage divider 108, an output capacitor 110, a switching converter controller 112, and a mode control circuit 114. The high-side switching transistor 102 is coupled between voltage input terminal and a switching terminal, and the low-side switching transistor 104 is coupled between the switching terminal and a reference terminal (e.g., ground). The switch mode converter 100 powers a load 111.

The switching converter controller 112 controls the high-side switching transistor 102 and the low-side switching transistor 104 to charge and discharge the inductor 106. When the high-side switching transistor 102 is turned on and the low-side switching transistor 104 is turned off, current flows from through the high-side switching transistor 102 to charge the inductor 106. When the low-side switching transistor 104 is turned on and the high-side switching transistor 102 is turned off, current flows through the low-side switching transistor 104 as the inductor 106 is discharged. Current flowing from the inductor 106 charges the output capacitor 110 and powers the load 111.

The voltage divider 108 is coupled to an output terminal 100A of the switch mode converter 100. The voltage divider 108 divides the output voltage (Vout) of the switch mode converter 100 to generate a feedback voltage (VFB) that is proportional to Vout. The switching converter controller 112 compares VFB to a reference voltage to generate an error signal used to control switching of the high-side switching transistor 102 and low-side switching transistor 104, a produce a desired value of output voltage Vout.

The high-side switching transistor 102 and the low-side switching transistor 104 form the power stage of the switch mode converter 100. The switching converter controller 112 can control switching of the high-side switching transistor 102 and the low-side switching transistor 104 to provide operation in a continuous conduction mode (CCM) or a discontinuous conduction mode (DCM). In CCM, the current flowing through the inductor 106 is continuous, with current either increasing or decreasing in a switching cycle. In DCM, the power stage may be in a high-impedance state with both the high-side switching transistor 102 and the low-side switching transistor 104 conducting no current. The switching converter controller 112 may provide DCM operation if the current drawn by the load 111 is very low. The reduced switching of DCM operation can increase the efficiency of the switch mode converter 100 with small load currents. However, when operating in DCM, the switch mode converter 100 may source current to the inductor 106, but may not sink current from the inductor 106. With no ability to sink current, if the current drawn by the load 111 drops suddenly while operating in DCM, Vout may rise. For example, Vout may increase to a voltage that is greater than the safe operating voltage of the load 111. Some systems may include circuitry that monitors Vout and turns off the switch mode converter 100 or disconnects the switch mode converter 100 from the load 111 if Vout exceeds a safe operating voltage of the load 111, which can cause the load 111 turn off or malfunction.

The mode control circuit 114 is coupled between the output terminal 100A and the switching converter controller 112 to detect an increase in Vout that may be due to reduction in load current while operating in DCM. If such an increase in Vout is detected, the mode control circuit 114 can cause the switching converter controller 112 to revert to operation in CCM. When operating in CCM, the switch mode converter 100 can source current to the inductor 106, and can sink current from the inductor 106. Accordingly, if Vout increases due to a reduction in load current while the switch mode converter 100 is operating in DCM, the mode control circuit 114 can cause the switch mode converter 100 to reduce Vout by reverting to CCM operation for a short time. After Vout has been reduced to less than a threshold voltage (e.g., less than a selected overvoltage threshold), the mode control circuit 114 may allow the switch mode converter 100 to return to DCM operation.

The mode control circuit 114 has an input coupled to the output terminal 100A (via the voltage divider 108) for receiving a representation of Vout. The mode control circuit 114 has an output coupled to a conduction mode input of the switching converter controller 112. The mode control circuit 114 provides a CCM control signal (CCM CONTROL) at the output of the mode control circuit 114 to cause the switching converter controller 112 to switch from DCM to CCM operation if Vout exceeds an overvoltage threshold.

While the switch mode converter 100 is illustrated as a buck converter, implementations of the mode control circuit 114 may be applied in a boost converter, a buck-boost converter, or other type of single or multi-phase switch mode converter. Implementations of the switch mode converter 100 may be used in a wide variety of applications that benefit from accurate current sensing. For example, the switch mode converter 100 may be used in various applications that may benefit from or require compliance with functional safety standards.

Figure 2:
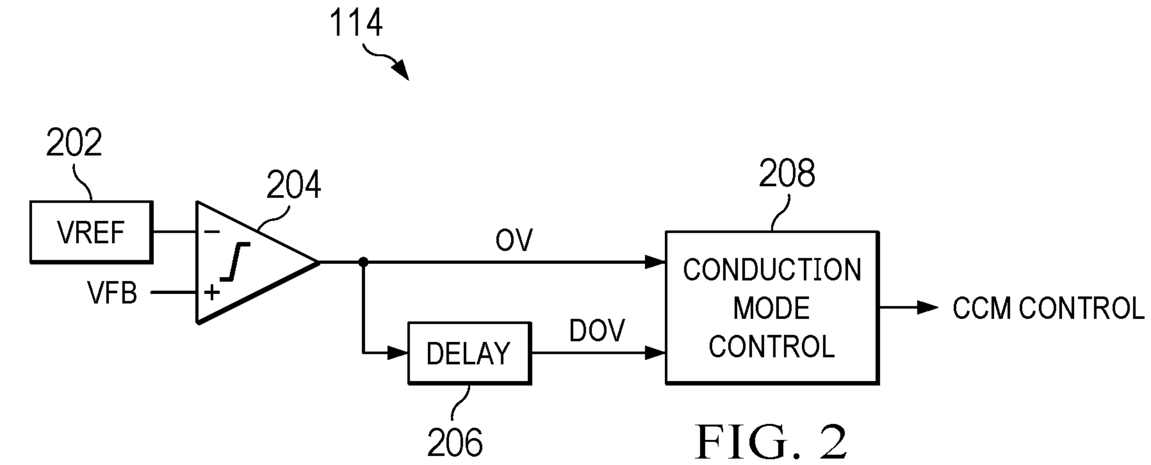
FIG. 2 is a block diagram of an example conduction mode control circuit suitable for use in the switch mode converter of FIG. 1.

FIG. 2 is a block diagram of an example mode control circuit 114 suitable for use in the switch mode converter 100. The mode control circuit 114 includes a reference voltage circuit 202, a comparator 204, a delay circuit 206, and conduction mode control circuit 208. The reference voltage circuit 202 generates a reference voltage VREF that defines an overvoltage threshold.

The comparator 204 has a first input coupled to the output of the reference voltage circuit 202 for receiving the overvoltage threshold voltage, and a second input coupled to the output terminal 100A via the voltage divider 108 for receiving VFB. The comparator 204 compares VFB (which is representative of Vout) provided by the voltage divider 108 to the overvoltage threshold provided by the reference voltage circuit 202. An output signal OV, provided at the output of the comparator 204, indicates whether Vout is greater than the overvoltage threshold. The comparator 204 provides OV in a first state (e.g., logic high, or overvoltage state) indicating that Vout is greater than the overvoltage threshold, and provides OV in a second state (e.g., logic low) indicating that Vout is not greater than the overvoltage threshold.

An input of the delay circuit 206 is coupled to the output of the comparator 204. The delay circuit 206 has an output at which a delayed overvoltage signal (DOV) is provided. The delay circuit 206 may provide the DOV in the first state (e.g., a logic high, or overvoltage state) if the OV has the first state for a selected delay time. For example, if the OV maintains the first state for the selected delay time (e.g., a selected transient suppression time), then the delay circuit 206 may cause DOV to transition from the second state (e.g., logic low) to the first state (e.g., logic high). In one example, the delay circuit 206 can be implemented as a timer that is incremented if the OV has the first state and the DOV has the second state, and reset if the OV is in the second state in some examples. Other implementations of the delay circuit 206 may be implemented with different circuitry (e.g., charging a capacitor to a threshold) in other examples. The delay time provided by the delay circuit 206 may be greater than 100 microseconds in some examples.

The conduction mode control circuit 208 has a first input coupled to the output of the comparator 204 for receipt of OV, and second input coupled to the output of the delay circuit 206 for receipt of DOV. The conduction mode control circuit 208 generates the CCM CONTROL signal based on OV and DOV. An output of the conduction mode control circuit 208 is coupled to the input of the switching converter controller 112. The conduction mode control circuit 208 may generate CCM CONTROL as shown in Table 1.

TABLE 1

| OV | DOV | CCM CONTROL |
|---|---|---|
| 0 | 0 | 0 |
| 0 | 1 | 0 |
| 1 | 0 | 1 |
| 1 | 1 | 0 |

Accordingly, the conduction mode control circuit 208 sets CCM CONTROL to the first state (e.g., logic one, or CCM state) if OV has the first state (indicating that Vout exceeds the overvoltage threshold) and DOV has the second state (indicating that the delay time started with assertion of OV has not expired). The conduction mode control circuit 208 sets CCM CONTROL to the second state (e.g., logic zero, or DCM state) in all other state combination of OV and DOV. The switching converter controller 112 operates in CMM responsive to CCM CONTROL having the first state. For example, if the switching converter controller 112 is operating in DCM, and the switching converter controller 112 provides CCM CONTROL in the first state, the switching converter controller 112 can transition from operation in DCM to operation in CCM to attempt to pull-down (reduce) Vout. If the conduction mode control circuit 208 provides CCM CONTROL in the second state, the switching converter controller 112 may operate in DCM if appropriate based on load current.

Figure 3:
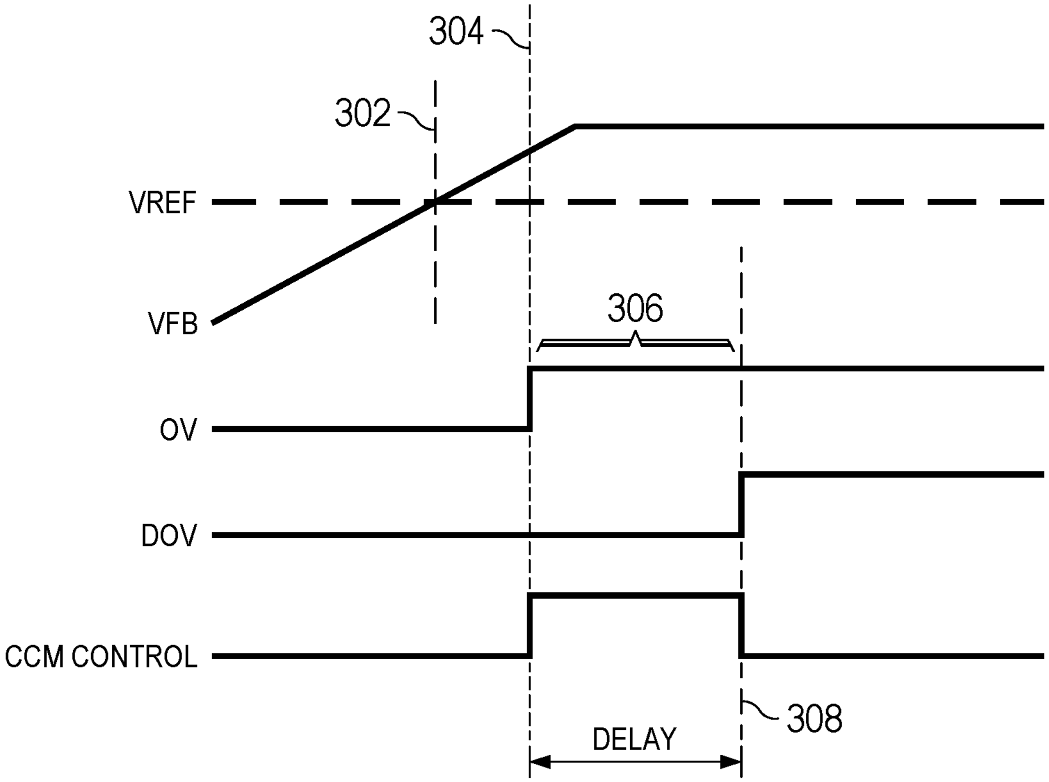
FIGS. 3 and 4 are graphs of example signals in the conduction mode control circuit of FIG. 2.
Figure 4:
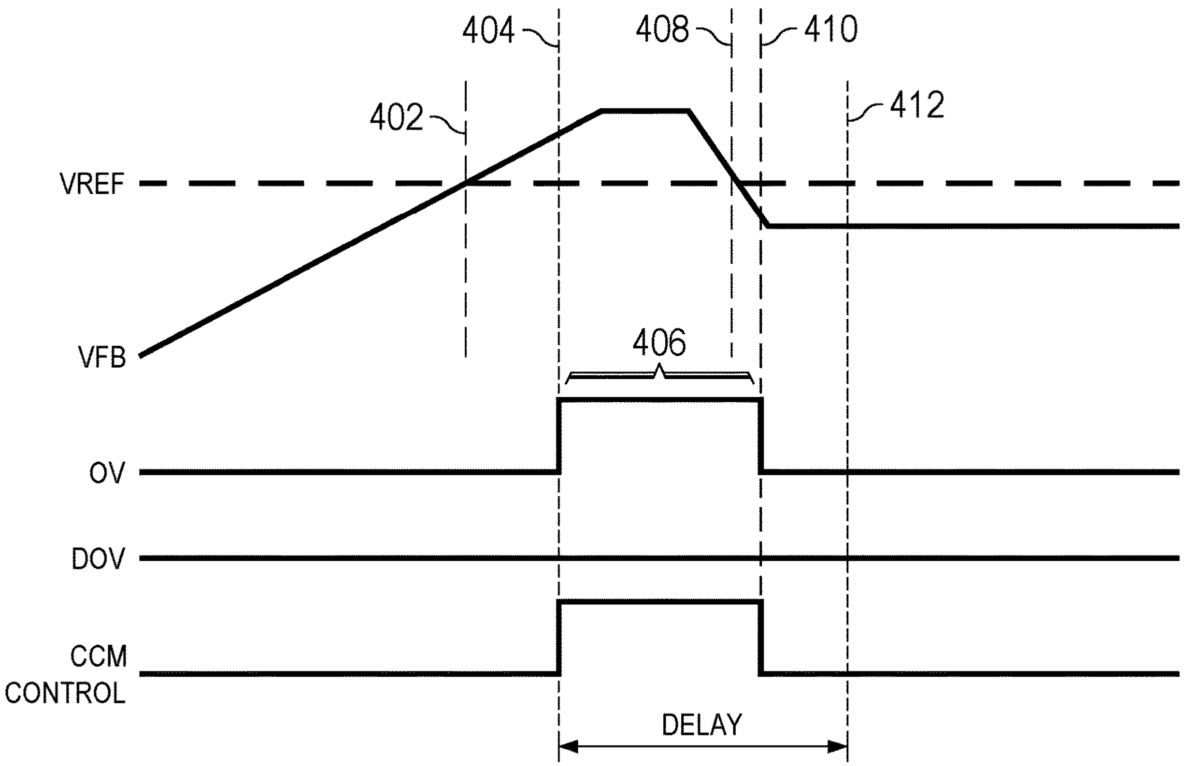

FIGS. 3 and 4 are graphs of example signals in the switching converter controller 112. The signals VREF, VFB, OV, DOV, and CCM CONTROL as shown in FIGS. 3 and 4. In FIG. 3, VFB is a scaled representation of Vout. Vout and VFB are increasing at time 302, and VFB exceeds VREF, indicating that Vout exceeds the overvoltage threshold. The switch mode converter 100 is operating in DCM at time 302. At time 304, the comparator 204 sets OV to a logic high. The timing of transition of OV from logic low to logic high may be delayed (as shown in FIG. 3) due to hysteresis applied in the comparator 204. At time 304, the conduction mode control circuit 208 sets CCM CONTROL to a logic high based on the states of OV and DOV (as shown in Table 1). In the interval 306, between transition of OV to logic high and transition of DOV to logic high, the switching converter controller 112 is causing the switch mode converter 100 to operate in CCM, which allows the switch mode converter 100 to draw current from the output terminal 100A. In FIG. 3, CCM operation does not reduce Vout, and VFB does not fall below VREF. For example, in FIG. 3 the increase in Vout was not caused by a reduction current drawn by the load 111. At time 308, the delay circuit 206 sets DOV to a logic high, and the conduction mode control circuit 208 sets CCM CONTROL to a logic low in response. With CCM CONTROL set to a logic low, the switching converter controller 112 may revert to DCM.

In FIG. 4, VFB is a scaled representation of Vout. Vout and VFB are increasing at time 402, and VFB exceeds VREF, indicating that Vout exceeds the overvoltage threshold. The switch mode converter 100 is operating in DCM at time 402. At time 404, the comparator 204 sets OV to a logic high. The timing of transition of OV from logic low to logic high may be delayed (as shown in FIG. 4) due to hysteresis applied in the comparator 204. At time 404, the conduction mode control circuit 208 sets CCM CONTROL to a logic high based on the states of OV and DOV (as shown in Table 1). In the interval 406, while CCM CONTROL has a logic high state, the switching converter controller 112 is causing the switch mode converter 100 to operate in CCM, which allows the switch mode converter 100 to draw current from the output terminal 100A. In FIG. 4, CCM operation reduces Vout, and at time 408 VFB falls below VREF. At time 410, the comparator 204 sets OV to a logic low state responsive to the reduction of Vout and VFB. The timing of transition of OV from logic high to logic low may be delayed (as shown in FIG. 4) due to hysteresis applied in the comparator 204. At time 410, the conduction mode control circuit 208 reverts CCM CONTROL to logic low state, and in response, the switching converter controller 112 may revert to DCM operation. At time 412, the selected delay time expires (relative to time 404), and DOV remains in a logic low state.

Figure 5:
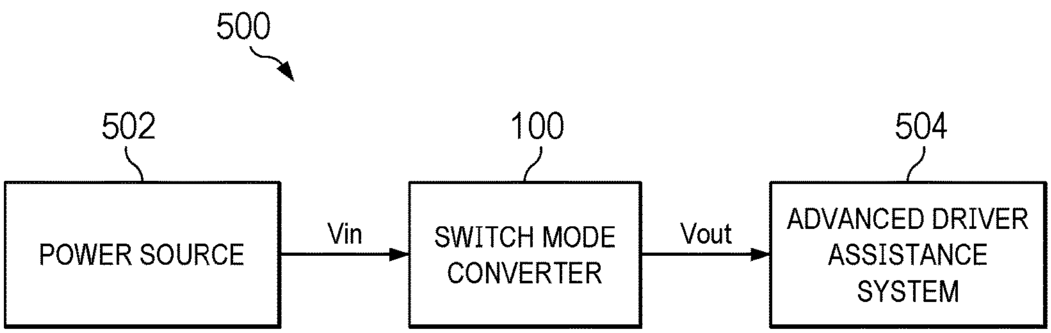
FIG. 5 is a block diagram of an example system that includes the switch mode converter of FIG. 1.

FIG. 5 is a block diagram of an example system 500 that includes the switch mode converter 100. The system 500 also includes a power source 502 and an advanced driver assistance system (ADAS) 504. The power source 502 may be a battery, such as a battery that powers vehicle electrical/electronic systems. The power source 502 provides voltage Vin at an output of the power source 502. The output of the power source 502 is coupled to an input of the switch mode converter 100. The switch mode converter 100 generates Vout from Vin. The output of the switch mode converter 100 (e.g., output terminal 100A) is coupled to an input of the ADAS 504. The ADAS 504 can apply Vout to power electronic circuits (e.g., processors, memory, sensors, display, etc.) of the ADAS 504. Other implementations of the system 500 may include different circuitry in place of the ADAS 504 (e.g., an infotainment system, an instrument cluster system, an industrial control system, etc.)

Because the switch mode converter 100 includes the mode control circuit 114, the switch mode converter 100 can reduce the incidence of disruption in Vout provided to the ADAS 504 caused reductions in current drawn by the ADAS 504 while the switch mode converter 100 is operating in DCM. Accordingly, the operation of the system 500 may be more reliable than operation of similar systems that lack the switch mode converter 100.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") (such as an n-channel FET (NFET) (n-type transistor) or a p-channel FET (PFET)) (p-type transistor)), a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors, or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input (or transistor control terminal) is the gate, and the current terminals are the drain and source. In the context of a BJT, the control input is the base, and the current terminals are the collector and emitter.

References herein to a FET being "ON" means that the conduction channel of the FET is present and drain current may flow through the FET. References herein to a FET being "OFF" means that the conduction channel is not present so drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same terminals. For example, a resistor or capacitor shown and described herein as a single component may instead be multiple resistors or capacitors, respectively, coupled in series between the same two terminals as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

What is claimed is:

1. A circuit comprising:

an input terminal configured to receive a converter output voltage;

a reference voltage circuit having an output;

a comparator having a first input coupled to the input terminal, a second input coupled to the output of the reference voltage circuit, and an overvoltage output;

a delay circuit having an input coupled to the overvoltage output, and a delayed overvoltage output, the delay circuit configured to delay an overvoltage signal from the comparator;

a conduction mode control circuit having a first input coupled to the overvoltage output, a second input coupled to the delayed overvoltage output, and a mode output, the conduction mode control circuit configurable to provide a continuous conduction mode (CCM) control signal at the mode output; and a switching converter controller having a conduction mode input coupled to the mode output.

2. The circuit of claim 1, wherein:

the conduction mode control circuit is configurable to set the CCM control signal to a first state responsive to the overvoltage signal at the overvoltage output having the first state; and the switching converter controller is configurable to operate in a continuous conduction mode responsive to the CCM control signal in the first state.

3. The circuit of claim 2, wherein:

the conduction mode control circuit is configurable to change the CCM control signal from the first state to a second state responsive to the overvoltage signal changing from the first state to the second state; and the switching converter controller is configurable to operate in a discontinuous conduction mode responsive to the CCM control signal in the second state.

4. The circuit of claim 2, wherein:

the conduction mode control circuit is configurable to change the CCM control signal from the first state to a second state responsive to the overvoltage signal having the first state, and a delayed overvoltage signal at the delayed overvoltage output having the first state; and the switching converter controller is configurable to operate in a discontinuous conduction mode responsive to the CCM control signal in the second state.

5. The circuit of claim 4, wherein:

the comparator is configurable to compare the converter output voltage to an overvoltage threshold voltage; and the overvoltage signal having the first state indicates that the converter output voltage is greater than the overvoltage threshold voltage.

6. The circuit of claim 5, wherein the delay circuit is configurable to set the delayed overvoltage signal to an overvoltage state responsive to the overvoltage signal indicating that the converter output voltage is greater than the overvoltage threshold voltage for a selected transient suppression time.

7. The circuit of claim 2, further comprising a transistor having a first terminal coupled to a switch mode converter output, a second terminal coupled to a reference terminal, and a control terminal coupled to an output of the switching converter controller, wherein the switching converter controller is configurable to cause the transistor to conduct current from the switch mode converter output responsive to the CCM control signal having the first state.

8. A circuit comprising:

a switching converter controller configured to control switching of a switch mode converter circuit;

a comparator configured to compare a switch mode converter output voltage to an overvoltage threshold voltage, and provide an overvoltage signal indicating that the switch mode converter output voltage is greater than the overvoltage threshold voltage;

a delay circuit coupled to the comparator, the delay circuit configured to delay the overvoltage signal from the comparator, and provide a delayed overvoltage signal; and a conduction mode control circuit having inputs coupled to the comparator and the delay circuit, and a mode output coupled to the switching converter controller, the conduction mode control circuit configurable to cause the switching converter controller to transition from operation in a discontinuous conduction mode to a continuous conduction mode (CCM) responsive to the overvoltage signal and the delayed overvoltage signal.

9. The circuit of claim 8, wherein:

the conduction mode control circuit is configurable to provide a CCM control signal at the mode output; and the conduction mode control circuit is configured to set the CCM control signal to a CCM state responsive to the overvoltage signal indicating that the switch mode converter output voltage is greater than the overvoltage threshold voltage; and the switching converter controller is configurable to operate in a continuous conduction mode responsive to the CCM control signal in the CCM state.

10. The circuit of claim 9, wherein:

the conduction mode control circuit is configurable to change the CCM control signal from the CCM state to a DCM state responsive to the overvoltage signal indicating that the switch mode converter output voltage is not greater than the overvoltage threshold voltage; and the switching converter controller is configurable to operate in the discontinuous conduction mode responsive to the CCM control signal in the DCM state.

11. The circuit of claim 9, wherein the conduction mode control circuit is configurable to change the CCM control signal from the CCM state to a DCM state responsive to the overvoltage signal indicating that the switch mode converter output voltage is greater than the overvoltage threshold voltage, and the delayed overvoltage signal indicating that an overvoltage is present after a delay time; and the switching converter controller is configurable to operate in the discontinuous conduction mode responsive to the CCM control signal in the DCM state.

12. The circuit of claim 9, further comprising a power stage having an output coupled to an input of the comparator and an input coupled an output of the switching converter controller, the switching converter controller configurable to cause the power stage to sink current through the output responsive to the CCM control signal having the CCM state.

13. The circuit of claim 8, wherein the delay circuit is configured to set the delayed overvoltage signal to an overvoltage state responsive to the overvoltage signal indicating that the switch mode converter output voltage is greater than the overvoltage threshold voltage for a selected transient suppression time.

14. A system comprising:

a power source having an output;

a switch mode converter circuit having an input coupled to the output of the power source; and an advanced driver assistance system having an input coupled to the output of the switch mode converter circuit, the switch mode converter circuit including:

a reference voltage circuit having an output;

a comparator having a first input coupled to the output of the switch mode converter circuit, a second input coupled to the output of the reference voltage circuit, and an overvoltage output;

a delay circuit having an input coupled to the overvoltage output, and a delayed overvoltage output, the delay circuit configured to delay an overvoltage signal from the comparator;

a conduction mode control circuit having a first input coupled to the overvoltage output, a second input coupled to the delayed overvoltage output, and a mode output, the conduction mode control circuit configurable to provide a continuous conduction mode (CCM) control signal at the mode output; and a switching converter controller having a continuous conduction mode (CCM) input coupled to the mode output.

15. The system of claim 14, wherein the conduction mode control circuit is configurable to cause the switching converter controller to operate in a CCM responsive to the overvoltage signal provided at the overvoltage output and a delayed overvoltage signal provided at the delayed overvoltage output.

16. The system of claim 14, wherein:

the conduction mode control circuit is configurable to set the CCM control signal to a first state responsive to the overvoltage signal at the overvoltage output having the first state, and a delayed overvoltage signal at the delayed overvoltage output having a second state; and the switching converter controller is configurable to operate in a CCM responsive to the CCM control signal in the first state.

17. The system of claim 16, wherein:

the conduction mode control circuit is configurable to change the CCM control signal from the first state to the second state responsive to the overvoltage signal changing from the first state to the second state; and the switching converter controller is configurable to operate in a discontinuous conduction mode responsive to the CCM control signal in the second state.

18. The system of claim 16, wherein:

the conduction mode control circuit is configurable to change the CCM control signal from the first state to the second state responsive to the overvoltage signal having the first state, and the delayed overvoltage signal having the first state; and the switching converter controller is configurable to operate in a discontinuous conduction mode responsive to the CCM control signal in the second state.

19. The system of claim 16, wherein:

the comparator is configured to compare a representation of a converter output voltage provided at the output of the switch mode converter circuit to an overvoltage threshold voltage; and the overvoltage signal having the first state indicates that the representation of the converter output voltage is greater than the overvoltage threshold voltage.

20. The system of claim 16, wherein the delay circuit is configured to set the delayed overvoltage signal to indicate an overvoltage responsive to the overvoltage signal having the first state for a selected transient suppression time.

* * * * *